(12) United States Patent
Kim et al.

(10) Patent No.: US 11,993,852 B2
(45) Date of Patent: May 28, 2024

(54) METHOD FOR MANUFACTURING STAINLESS STEEL FOR POLYMER FUEL CELL SEPARATOR HAVING EXCELLENT CONTACT RESISTANCE

(71) Applicant: POSCO, Pohang-si (KR)

(72) Inventors: Jong Hee Kim, Daejeon (KR); Kwang-Min Kim, Pohang-si (KR); Bo-Sung Seo, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 754 days.

(21) Appl. No.: 17/253,866

(22) PCT Filed: Jun. 20, 2018

(86) PCT No.: PCT/KR2018/006958
§ 371 (c)(1),
(2) Date: Dec. 18, 2020

(87) PCT Pub. No.: WO2019/245076
PCT Pub. Date: Dec. 26, 2019

(65) Prior Publication Data
US 2021/0269920 A1    Sep. 2, 2021

(51) Int. Cl.
| | | |
|---|---|---|
| C23C 22/06 | (2006.01) | |
| C22C 38/00 | (2006.01) | |
| C22C 38/02 | (2006.01) | |
| C22C 38/20 | (2006.01) | |
| C22C 38/22 | (2006.01) | |
| C22C 38/24 | (2006.01) | |
| C22C 38/26 | (2006.01) | |
| C22C 38/28 | (2006.01) | |
| C23C 22/78 | (2006.01) | |
| C25F 1/06 | (2006.01) | |
| H01M 8/021 | (2016.01) | |
| H01M 8/0228 | (2016.01) | |

(52) U.S. Cl.
CPC ............ *C23C 22/06* (2013.01); *C22C 38/001* (2013.01); *C22C 38/002* (2013.01); *C22C 38/02* (2013.01); *C22C 38/20* (2013.01); *C22C 38/22* (2013.01); *C22C 38/24* (2013.01); *C22C 38/26* (2013.01); *C22C 38/28* (2013.01); *C23C 22/78* (2013.01); *C25F 1/06* (2013.01); *H01M 8/021* (2013.01); *H01M 8/0228* (2013.01)

(58) Field of Classification Search
None
See application file for complete search history.

(56) References Cited

U.S. PATENT DOCUMENTS

| | | |
|---|---|---|
| 6,379,476 B1 | 4/2002 | Tarutani et al. |
| 2010/0120349 A1 | 5/2010 | Kristensson et al. |
| 2020/0280075 A1* | 9/2020 | Kim ............... C22C 38/04 |

FOREIGN PATENT DOCUMENTS

| | | | |
|---|---|---|---|
| DE | 3025342 A1 | 1/1982 | |
| EP | 2667439 A1 | 11/2013 | |
| JP | H09-165700 A | 6/1997 | |
| JP | 2003-223904 A | 8/2003 | |
| JP | 2005-166276 A | 6/2005 | |
| JP | 2011-226770 A | 11/2011 | |
| KR | 10-2006-0123779 A | 12/2006 | |
| KR | 10-2009-0066866 A | 6/2009 | |
| KR | 10-2016-0082632 A | 7/2016 | |
| KR | 101729037 B1 * | 4/2017 | ........... C22C 38/001 |
| KR | 10-2018-0073157 A | 7/2018 | |
| WO | 2017/105142 A1 | 6/2017 | |
| WO | 2018/198685 A1 | 11/2018 | |

OTHER PUBLICATIONS

Extended European Search Report dated Jun. 2, 2021 issued in European Patent Application No. 18922989.1.
International Search Report dated Mar. 18, 2019 issued in International Patent Application No. PCT/KR2018/006958 (with English translation).
Canadian Office Action dated Jul. 21, 2022 issued in Canadian Patent Application No. 2,929,520.
Canadian Office Action dated Nov. 29, 2021 issued in Canadian Patent Application No. 3104062.
Japanese Office Action dated Dec. 7, 2021 issued in Japanese Patent Application No. 2020-571432 (with English translation).
Canadian Office Action dated Jul. 21, 2022 issued in Canadian Patent Application No. 3, 104,062.
Chinese Office Action dated Dec. 4, 2023 issued in Chinese Patent Application No. 201880095793.6 (with English translation).

* cited by examiner

*Primary Examiner* — Anthony M Liang
(74) *Attorney, Agent, or Firm* — Morgan, Lewis & Bockius LLP

(57) ABSTRACT

Disclosed is a method of manufacturing a stainless steel with excellent contact resistance for a polymer fuel cell separator. The method of manufacturing a stainless steel with excellent contact resistance for a polymer fuel cell separator according to an embodiment of the present disclosure includes: electrolyzing to remove a first passivation film formed on a cold-rolled thin sheet of a stainless steel comprising, in percent (%) by weight of the entire composition, C: greater than 0 to 0.1%, N: greater than 0 to 0.02%, Si: greater than 0 to 0.25%, Mn: greater than 0 to 0.2%, P: greater than 0 to 0.04%, S: greater than 0 to 0.02%, Cr: 22 to 34%, Ti: greater than 0 to 0.5%, Nb: greater than 0 to 0.5%, the remainder of iron (Fe) and other inevitable impurities; and immersing in a mixed acid solution of nitric acid and hydrofluoric acid to form a second passivation film on the stainless cold-rolled thin sheet.

2 Claims, 1 Drawing Sheet

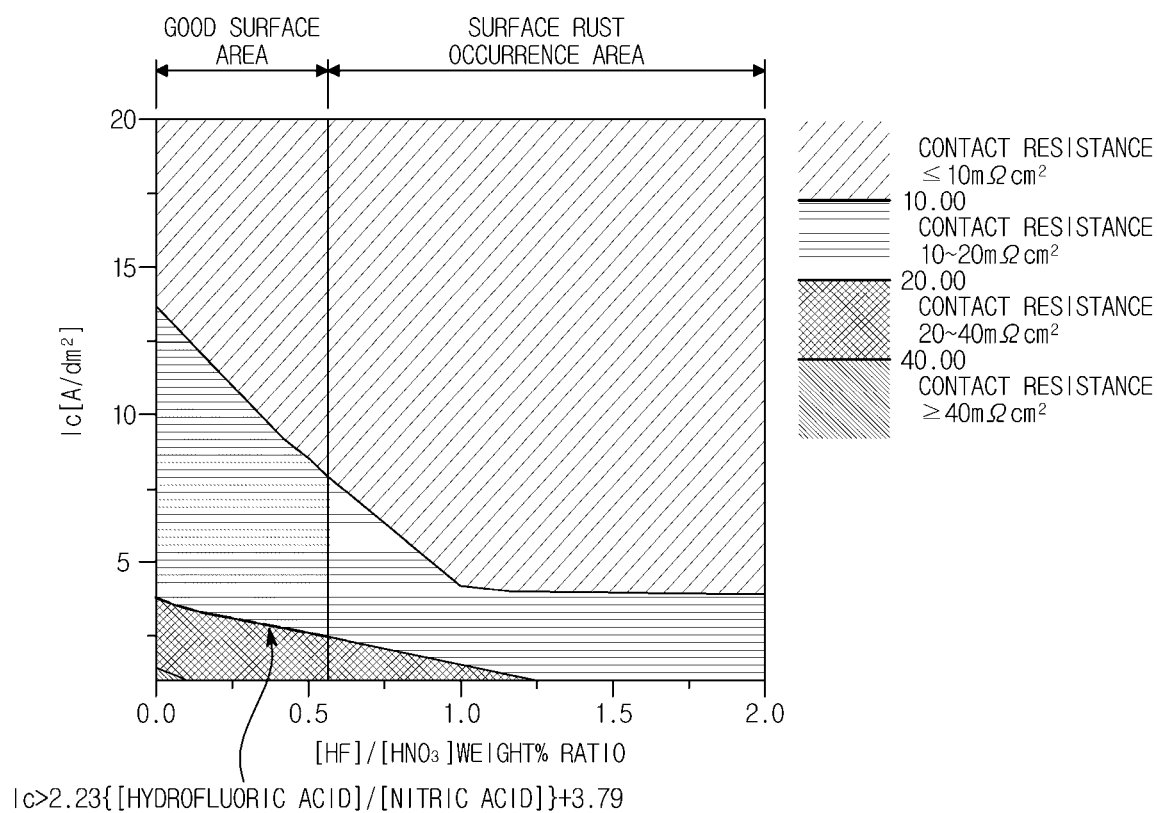

… … …

METHOD FOR MANUFACTURING STAINLESS STEEL FOR POLYMER FUEL CELL SEPARATOR HAVING EXCELLENT CONTACT RESISTANCE

TECHNICAL FIELD

The present disclosure relates to stainless steel for a polymer fuel cell separator and a method of manufacturing the same, and more particularly, to stainless steel for a polymer fuel cell separator having excellent contact resistance and a method for manufacturing the same.

BACKGROUND ART

A Polymer Electrolyte Membrane Fuel Cell (PEMFC) is a fuel cell using a polymer film having hydrogen ion exchange properties as an electrolyte, and has a low operation temperature of about 80° C. and high efficiency compared to other types of fuel cells. Also, the PEMFC has fast startup, high output density, and a simple main-body structure. For these reasons, the PEMFC can be used for vehicles or homes.

The PEMFC has a unit cell structure in which gas diffusion layers and separators are stacked on both sides of a Membrane Electrode Assembly (MEA) consisting of an electrolyte, an anode electrode, and a cathode electrode. Several unit cells are connected in series to form a fuel cell stack.

The separators supply fuel (hydrogen and reformed gas) and an oxidizer (oxygen and air) to the electrodes of the fuel cell. In the separators, flow paths for discharging water, which is an electrochemical reactant, may be formed. The separators perform a function of mechanically supporting the MEA and the gas diffusion layers and a function of electrically connecting to neighboring unit cells.

Typically, the separators have been manufactured with a graphite material. However, recently, stainless steel is widely used to manufacture the separators, in consideration of the manufacturing cost, weight, etc. Stainless steel to be used to manufacture the separators should have excellent corrosiveness in a strong acidic environment which is the operating environment of fuel cells, and have excellent corrosion resistance in view of weight reduction, miniaturization, and productivity.

However, conventional stainless steel exhibits high resistance due to a passive film formed on a surface, which can lead to resistance loss in fuel cell performance, to overcome this problem, a process of coating a conductive material such as gold (Au), carbon, or nitride has been proposed. However, these methods have problems in that the manufacturing cost and the manufacturing time are increased due to the additional process for coating a noble metal or a coating material, thereby reducing the productivity.

In order to solve these problems, studies are underway to lower the contact resistance by surface modification.

Patent Document 1 proposes stainless steel for the separator having low interfacial contact resistance and high corrosion potential by controlling the surface modification process. Patent Document 2 proposes a method of producing stainless steel having improved corrosion resistance and contact resistance by immersing stainless steel containing 17 to 23% Cr in a solution of [HF]≥[HNO$_3$].

However, these methods have an immersion process essentially accompanying [HF], and are difficult to manufacture due to environmental constraints, and are not environmentally friendly. In addition, there is a problem of deteriorating the service life of the fuel cell by excessively including [HF], impairing the stability of the passivation film of stainless steel and the passivation film in the over-passive region.

(Patent Document 0001) Korean Patent Publication No. 10-2014-0081161
(Patent Document 0002) Korean Patent Publication No. 10-2013-0099148

DISCLOSURE

Technical Problem

The present disclosure is directed to providing a method of manufacturing a stainless steel for a polymer fuel cell separator capable of improving corrosion resistance by removing the non-conductive film formed on the surface of the stainless steel and forming a new conductive film, and capable of securing excellent contact resistance without an additional surface treatment such as a separate coating.

Technical Solution

In accordance with an aspect of the present disclosure, a method of manufacturing a stainless steel with excellent contact resistance for a polymer fuel cell separator includes: electrolyzing to remove a first passivation film formed on a cold-rolled thin sheet of a stainless steel comprising, in percent (%) by weight of the entire composition, C: greater than 0 to 0.1%, N: greater than 0 to 0.02%, Si: greater than 0 to 0.25%, Mn: greater than 0 to 0.2%, P: greater than 0 to 0.04%, S: greater than 0 to 0.02%, Cr: 22 to 34%, Ti: greater than 0 to 0.5%, Nb: greater than 0 to 0.5%, the remainder of iron (Fe) and other inevitable impurities, and immersing in a mixed acid solution of nitric acid and hydrofluoric acid to form a second passivation film on the stainless cold-rolled thin sheet, and the current density applied in the electrolyzing and the concentration ratio of hydrofluoric acid and nitric acid in immersing in a mixed acid solution of nitric acid and hydrofluoric acid satisfy the following equation (1).

$$Ic > -2.23([\text{hydrofluoric acid}]/[\text{nitric acid}]) + 3.79 \quad (1)$$

Here, Ic is the cathode applied current density (A/dm$^2$), and [hydrofluoric acid]/[nitric acid] means the weight ratio of hydrofluoric acid and nitric acid.

The cold-rolled thin sheet of the stainless steel may include Cr: greater than 23 to 34%.

The cold-rolled thin sheet of the stainless steel may further include any one or more selected from the group consisting of Cu: greater than 0 to 0.6%, V: greater than 0 to 0.6% and Mo: 0.05 to 2.5%.

The electrolyzing may be performed in 5 to 30% nitric acid or sulfuric acid solution at 40 to 80° C.

The cathode applied current density (Ic) in the electrolyzing may be 2 A/dm$^2$ or more The weight ratio of nitric acid to hydrofluoric acid in the mixed acid solution of nitric acid and hydrofluoric acid ([hydrofluoric acid]/[nitric acid]) may be 0.6 or less.

The mixed acid solution of nitric acid and hydrofluoric acid may include less than or equal to 10% hydrofluoric acid and less than or equal to 20% nitric acid.

The immersing may be performed in a mixed acid solution of nitric acid and hydrofluoric acid of 40 to 60° C.

The contact resistance of the second passivation film may be 20 mΩcm$^2$ or less.

Advantageous Effects

According to an embodiment of the present disclosure, the non-conductive film formed on the stainless steel surface is removed and a new conductive film is formed to improve corrosion resistance and at the same time secure surface contact resistance without additional surface treatment such as a separate coating, thereby reducing manufacturing cost and improving productivity.

In addition, it is an environmentally friendly process by minimizing hydrofluoric acid during the manufacturing process, and by minimizing hydrofluoric acid, it prevents the stability of the passivation film of stainless steel and the passivation film in the overpassive region from being impaired, thereby improving the durability of the fuel cell.

DESCRIPTION OF DRAWINGS

FIG. 1 is a graph showing a contact resistance value according to a cathode applied current density and a weight ratio of hydrofluoric acid and nitric acid in an electrolysis process of stainless steel for a polymer fuel cell separator according to an embodiment of the present disclosure.

MODES OF THE INVENTION

Hereinafter, the embodiments of the present disclosure will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

The method of manufacturing a stainless steel with excellent contact resistance for a polymer fuel cell separator according to an embodiment of the present disclosure includes: electrolyzing to remove a first passivation film formed on a cold-rolled thin sheet of a stainless steel, and immersing in a mixed acid solution of nitric acid and hydrofluoric acid to form a second passivation film on the stainless cold-rolled thin sheet.

The stainless cold-rolled thin sheet includes, in percent (%) by weight of the entire composition, C: greater than 0 to 0.1%, N: greater than 0 to 0.02%, Si: greater than 0 to 0.25%, Mn: greater than 0 to 0.2%, P: greater than 0 to 0.04%, S: greater than 0 to 0.02%, Cr: 22 to 34%, Ti: greater than 0 to 0.5%, Nb: greater than 0 to 0.5%, the remainder of iron (Fe) and other inevitable impurities.

Hereinafter, a reason for limiting the numerical value of the component content in an embodiment according to the present disclosure will be described. Hereinafter, unless otherwise specified, the unit is % by weight (wt %).

C: 0 to 0.1% (Excluding 0%), N: 0 to 0.02% (Excluding 0%)

Carbon (C) and nitrogen (N) may form Cr carbonitride of the stainless steel. As a result, the corrosion resistance of a layer with a lack of chrome (Cr) may be degraded. Accordingly, as the carbon (C) content and the nitrogen (N) content are lower, it will be more preferable. Therefore, in the present disclosure, the carbon (C) content may be limited to 0.1 wt % or less (excluding 0%), and the nitrogen (N) content may be preferably limited to 0.02 wt % or less (excluding 0%).

Si: 0 to 0.25% (Excluding 0%)

Although silicon (Si) is an element that is effective for deacidification, silicon (Si) suppresses toughness and formability, and SiO2 oxide produced during annealing degrades conductivity and hydrophilicity of a product. Therefore, in the present disclosure, the silicon (Si) content may be preferably limited to 0.25 wt % or less.

Mn: 0 to 0.2% (Excluding 0%)

Although manganese (Mn) is an element that is effective for deacidification, MnS, which is an inclusion, may reduce the corrosion resistance. Therefore, in the present disclosure, the manganese (Mn) content may be preferably limited to 0.2 wt % or less.

P: 0 to 0.04% (Excluding 0%)

Since phosphorus (P) reduces toughness as well as corrosion resistance, in the present disclosure, the phosphorus (P) content may be preferably limited to 0.04 wt % or less.

S: 0 to 0.02% (Excluding 0%)

Sulfur (S) may form MnS, and MnS may become a start point of corrosion to thereby reduce the corrosion resistance. Therefore, in the present disclosure, the sulfur (S) content may be preferably limited to 0.02 wt % or less.

Cr: 22 to 34%

Chromium (Cr) is an element that is effective in forming Cr hydroxide, which is effective in hydrophilicity, and increases corrosion resistance by preventing iron (Fe) from eluting in the acidic atmosphere in which the fuel cell is operated. However, when excessively added, toughness is reduced, and thus it is preferable to limit the composition ratio of chromium (Cr) to 20 to 34% in consideration of this in the present disclosure. More preferably, Cr may be included in an amount of more than 23 to 34%.

Ti: 0 to 0.5% (Excluding 0%), Nb: P: 0 to 0.5% (Excluding 0%)

Although titanium (Ti) and niobium (Nb) are elements that are effective in forming carbonitride from carbon (C) and nitrogen (N) in the steel, titanium (Ti) and niobium (Nb) may degrade toughness. Therefore, in the present disclosure, the titanium (Ti) content and the niobium (Nb) content may be preferably limited to 0.5 wt % or less.

Stainless steel according to an embodiment of the present disclosure may further include at least one selected from a group consisting of 0 to 0.6% of Cu (excluding 0%), 0 to 0.6% of V (excluding 0%), and 0.05 to 2.5% of Mo.

Cu: 0 to 0.6% (Excluding 0%)

Copper (Cu) is an element whose formability may deteriorate due to solid solution hardening, and nickel (Ni) is an element whose elution and formability may deteriorate when it is added by a small amount. Accordingly, copper (Cu) and nickel (Ni) are considered as impurities in the present disclosure.

V: 0 to 0.6% (Excluding 0%)

Vanadium (V) may be effective in lowering the elution of iron (Fe) in an environment in which the fuel cell operates. However, if vanadium (V) is excessively added, vanadium (V) may degrade toughness. Therefore, in the present disclosure, the vanadium (V) content may be preferably limited to 0 to 0.6 wt %.

Mo: 0.05 to 2.5%

Molybdenum (Mo) may be added as an element for increasing the corrosion resistance of the stainless steel. However, if molybdenum (Mo) is excessively added, toughness and hydrophilicity may be more or less degraded. Therefore, in the present disclosure, molybdenum (Mo) may be preferably limited to 0.05 to 2.5 wt %.

The method of manufacturing a stainless steel with excellent contact resistance for a polymer fuel cell separator according to an embodiment of the present disclosure includes an electrochemical electrolysis step of removing the first passivation film formed on the stainless steel cold-rolled thin sheet, and immersion in a mixed acid solution of nitric acid and hydrofluoric acid to form a second passivation film on the stainless steel thin sheet.

That is, when the stainless steel cold-rolled thin sheet on which the first passivation film is formed passes through the electrolysis step, the first passivation film is removed. After the first passivation film is removed, Fe adjacent to the surface of the stainless steel cold-rolled thin sheet is selectively eluted to increase the ratio of Cr on the surface. Accordingly, Cr is concentrated on the surface of the stainless steel cold-rolled thin sheet to form a chromium saturated layer.

For example, the electrolysis step may be performed in a nitric acid or sulfuric acid solution at 40 to 80° C.

When the temperature of the nitric acid or sulfuric acid solution is less than 40° C., the passivation film removal efficiency decreases and the effect of increasing the Cr ratio on the surface decreases, and the upper limit temperature is preferably limited to 80° C. in consideration of safety.

For example, the electrolysis step may be performed in a 5 to 30% nitric acid or sulfuric acid solution. For example, the concentration of nitric acid or sulfuric acid solution may be 50 to 300 g/f.

When the concentration of the nitric acid or sulfuric acid solution is less than 5%, the removal of the first passivation film on the surface of the stainless steel cold-rolled thin sheet is insufficient, and the selective elution amount of Fe on the surface of the cold-rolled thin sheet is small, so that the increase in the surface Cr ratio may be insufficient. In addition, even if the concentration of the nitric acid or sulfuric acid solution is more than 30%, the effect of removing the first passivation film is saturated, and since it is difficult to obtain an effect of increasing the surface Cr ratio due to excessive erosion of the stainless steel base material exposed after the first passivation film is removed, it is preferable to control it to 30% or less.

The electrolytic step is electrolytically treated in the nitric acid or sulfuric acid solution. For example, the electrolytic step may be performed by electrolytic treatment of a cathode electrode alone or a cross-electrolysis treatment of an anode and a cathode electrode.

For example, in the electrolysis step, a cathode applied current density Ic may be 2 $A/dm^2$ or more.

When the cathode applied current density Ic value is less than 2 $A/dm^2$, in the electrolytic process, the non-conductive first passivation film cannot be completely removed. The remaining first passivation film interferes with the electrochemical reaction essential in the subsequent nitric acid and hydrofluoric acid immersion process, thereby hindering the formation of the second passivation film. In addition, the first passivation film locally remaining on the surface acts as a cathode in the subsequent nitric acid and hydrofluoric acid immersion process, thereby generating a potential difference with the base material portion from which the first passivation film has been removed. This has a problem of causing excessive erosion locally on the base material.

When the cathode applied current density Ic value increases, the contact resistance of stainless steel surfaces subjected to nitric acid and hydrofluoric acid immersion also tends to increase. However, when the cathode applied current density Ic value exceeds 15 $A/dm^2$, contact resistance has a value of less than 10 $m\Omega cm^2$. Even if the cathode applied current density Ic value is increased, the effect of reducing contact resistance is saturated, so the increase of the effect is not significant. Therefore, as the current density increases while the first passivation film on the stainless steel surface is completely removed and the base material is exposed, there is a possibility of elution of the base material, making it difficult to obtain an effect of increasing the surface Cr ratio. Therefore, it is preferable to limit the cathode applied current density Ic value to 15 $A/dm^2$ or less.

After the electrolysis step, an immersion step is performed in a mixed acid solution of nitric acid and hydrofluoric acid to form a second passivation film on the stainless steel thin sheet. A second passivation film is formed by immersing the stainless base material on which the first passivation film is removed and the chromium saturated layer is formed in a mixed acid solution of nitric acid and hydrofluoric acid.

At the initial stage of immersion in the mixed acid solution, selective elution of Fe and dissolution of residual insoluble Si oxide on the surface of the stainless steel base material occur, resulting in an increase in the surface Cr ratio. The surface potential of the stainless steel thin sheet increases as a second passivation film, which is a new film by concentrated Cr, is formed after immersion.

For example, the immersion step in the mixed acid solution of nitric acid and hydrofluoric acid may be performed in a mixed acid solution of nitric acid and hydrofluoric acid of 40 to 60° C.

When the temperature of the mixed acid solution is less than 40° C. or more than 60° C., the effect of forming a new passivation film is lowered, so that the temperature range of the mixed acid solution is preferably limited as described above.

For example, the immersion step in the mixed acid solution of nitric acid and hydrofluoric acid may be performed in a mixed acid solution including 10% or less hydrofluoric acid and 20% or less nitric acid. For example, the mixed acid solution of nitric acid and hydrofluoric acid may include 100 g/f or less hydrofluoric acid and 200 g/f or less nitric acid.

When the concentration of nitric acid in the mixed acid is high, the effect of increasing the Cr ratio on the surface is saturated, and the effect of reducing contact resistance is lowered due to severe erosion of the stainless steel base material. Therefore, the nitric acid in the mixed acid solution is preferably 20% or less, that is, the concentration of nitric acid is limited to 200 g/f. However, if the concentration of nitric acid is too low, the effect of reducing contact resistance is lowered due to an increase in the surface Cr ratio or low efficiency of forming a new passivation film. Therefore, it is preferable to add 5% or more of nitric acid, i.e., 50 g/f or more in the mixed acid solution.

In the nitric acid and hydrofluoric acid immersion step, insoluble oxides that have not been sufficiently removed in the electrolysis step before can be removed with direct dissolution by hydrofluoric acid or elution of the stainless steel base material. In addition, hydrofluoric acid increases the effect of nitric acid by helping to remove metal ions through reaction with eluted metal ions. Therefore, when there is no insoluble oxide or when the effect of nitric acid can be sufficiently exhibited, the concentration of hydrofluoric acid is set to 0 in the nitric acid and hydrofluoric acid immersion step.

In the case of hydrofluoric acid, since it is difficult to treat the solution remaining after the manufacturing process, it is possible to achieve an environmentally friendly process through minimization thereof. Also, if the concentration of hydrofluoric acid is too high, the erosion of the stainless steel base material is severe, and the second passivation film is excessively eroded to impair the stability of the passivation film. In addition, it causes the destruction of the passivation film in the operating environment of the fuel cell and accelerates the elution of the Fe element in the base material, causing surface rust. Therefore, it is preferable that the concentration of hydrofluoric acid in the mixed acid solution is 10% or less, that is, the upper limit of the concentration of hydrofluoric acid is 100 g/f.

FIG. 1 is a graph showing a contact resistance value according to a cathode applied current density and a weight ratio of hydrofluoric acid and nitric acid in an electrolysis process of stainless steel for a polymer fuel cell separator according to an embodiment of the present disclosure.

Referring to FIG. 1, according to the method of manufacturing a stainless steel with excellent contact resistance for a polymer fuel cell separator according to an embodiment of the present disclosure, the current density applied in the electrolysis step and the concentration ratio of hydrofluoric acid and nitric acid in the nitric acid and hydrofluoric acid immersion step satisfy the following equation (1).

$$Ic > -2.23([\text{hydrofluoric acid}]/[\text{nitric acid}]) + 3.79 \quad (1)$$

Here, Ic is a cathode applied current density (A/dm$^2$), and [hydrofluoric acid]/[nitric acid] means a weight ratio of hydrofluoric acid and nitric acid.

If the above equation (1) regarding the current density and the concentration ratio of nitric acid and hydrofluoric acid is not satisfied, in the electrolytic process, the non-conductive first passivation film cannot be completely removed. The remaining first passivation film interferes with the electrochemical reaction essential in the subsequent nitric acid and hydrofluoric acid immersion process, thereby hindering the formation of the second passivation film. In addition, the first passivation film locally remaining on the surface acts as a cathode in the subsequent nitric acid and hydrofluoric acid immersion process, thereby generating a potential difference with the base material portion from which the first passivation film has been removed. This has a problem of causing excessive erosion locally on the base material.

For example, the weight ratio ([hydrofluoric acid]/[nitric acid]) of nitric acid to hydrofluoric acid in the mixed acid solution of nitric acid and hydrofluoric acid may be 0.6 or less.

In the acid immersion process of forming the second passivation film, the weight ratio of [hydrofluoric acid]/[nitric acid] should be limited to 0.6 or less, but when the weight ratio of [hydrofluoric acid]/[nitric acid] exceeds 0.6, the concentration of hydrofluoric acid is relatively too large, and the erosion of the stainless steel base material is severe, and excessive erosion of the re-formed second passivation film impairs the stability of the passivation film, which in turn causes the destruction of the passivation film in the fuel cell operating environment and accelerates the elution of the Fe element in the base material, causing surface rust. In addition, it was found that this surface rust may be a major cause of deterioration of the fuel cell membrane electrode assembly (MEA).

Thereafter, the stainless steel thin sheet may be washed with water and dried with warm air at a temperature of 300° C. or less.

Therefore, the second passivation film of stainless steel for a polymer fuel cell separator having excellent contact resistance according to an embodiment of the present disclosure has an interface contact resistance of 20 mΩcm$^2$ or less at a contact pressure of 100 N/cm$^2$, thereby, the value below the commercialization target of the fuel cell separator can be achieved.

That is, the stainless steel for a polymer fuel cell separator according to an embodiment of the present disclosure may include a passivation film having excellent contact resistance.

The present disclosure will be described in more detail through the following examples.

Inventive Steel

Inventive Steels 1 to 6 and Comparative Steels 1 and 2 according to embodiments of the present disclosure each include the composition of Table 1 below, stainless steel material according to the present disclosure was produced through 50 kg ingot casting. The ingot was heated at 1,200° C. for 3 hours and then hot-rolled to a thickness of 4 mm. The hot-rolled material was cold-rolled to a final cold-rolled thickness of 2.5 mm, followed by annealing at 960° C. for 5 minutes in a 100% hydrogen atmosphere.

The final annealed material was cut into 8 sheets of 10 cm*10 cm in width and length, respectively, and then by machining, anode and cathode flow path processing was performed so that a gas flow path having an effective electrode area of 5 cm*5 cm was formed. Each specimen was subjected to emulsion shot blasting until the same surface roughness (Ra<0.1 μm).

TABLE 1

| | C | N | Si | Mn | P | S | Cr | Cu | Mo | V | Ti | Nb |
|---|---|---|---|---|---|---|---|---|---|---|---|---|
| Inventive Steel1 | 0.009 | 0.011 | 0.15 | 0.14 | 0.009 | 0.008 | 30 | — | — | 0.3 | 0.05 | 0.12 |
| Inventive Steel2 | 0.008 | 0.011 | 0.14 | 0.12 | 0.011 | 0.009 | 30.1 | 0.053 | — | — | 0.13 | 0.11 |
| Inventive Steel3 | 0.008 | 0.009 | 0.11 | 0.15 | 0.03 | 0.004 | 29.7 | — | 2 | — | 0.1 | 0.17 |
| Inventive Steel4 | 0.006 | 0.01 | 0.13 | 0.16 | 0.009 | 0.009 | 30 | — | — | — | 0.05 | 0.15 |
| Inventive Steel5 | 0.01 | 0.013 | 0.12 | 0.16 | 0.018 | 0.007 | 25 | 0.06 | — | 0.2 | 0.05 | 0.12 |
| Inventive Steel6 | 0.09 | 0.018 | 0.13 | 0.18 | 0.017 | 0.006 | 22.1 | — | — | — | 0.1 | 0.1 |
| Comparative Steel1 | 0.003 | 0.011 | 0.11 | 0.14 | 0.015 | 0.008 | 20.1 | — | 1.7 | — | 0.11 | 0.2 |
| Comparative Steel2 | 0.004 | 0.009 | 0.19 | 0.19 | 0.018 | 0.008 | 17.3 | 0.5 | — | — | 0.05 | 0.12 |

The initial contact resistance was measured through the respective electrochemical electrolysis process and nitric acid and hydrofluoric acid immersion according to the conditions of Table 2 below for the processed material of gas flow path having a size of 10 cm*10 cm formed as described above.

For initial contact resistance evaluation, prepare a gold-plated copper plate and place a gas diffusion layer (10BA from SGL) between the processing area (5*5 cm$^2$) and the gold-plated copper plate (10*10 cm$^2$) and the separator. And measure the total resistance of the gas diffusion layer between the separators on both sides by DC 4-probe method that measures by contacting each current terminal and voltage terminal with the gold-plated copper plate and separator, respectively, and an obtain ½ of the value, and the value was multiplied by the total area to take as the contact resistance value of the separator and the gas diffusion layer, and measured four times in total to obtain the average value.

The fuel cell endurance test was carried out by configuring a unit cell using Gore's MEA for each manufactured separator, and performing a static potential endurance test at 0.6V for 300 hours. When the surface condition of the separator after the endurance test was observed, when there is rust discoloration on the surface, it is marked with O, and when it is not rusted, it is marked with X.

Table 2 shows the contact resistance and the results of surface rust evaluation after the fuel cell endurance test according to the above-described current density and [hydrofluoric acid]/[nitric acid] weight % ratio.

An inventive example was that the contact resistance was less than 20 mΩcm2 and no surface rust was found after the fuel cell endurance test, and the others are shown as comparative examples.

TABLE 2

| | Electrolysis process | | nitric acid and hydrofluoric acid iImmersion nitric | | | [hydrofluoric acid]/[nitric acid] | contact resistance (mΩcm$^2$) | surface rust after endurance test | remark |
|---|---|---|---|---|---|---|---|---|---|
| | solution | temperature (° C.) | acid (wt %) | hydrofluoric acid (wt %) | Ic (A/dm$^2$) | | | | |
| Inventive Steel1 | 15% Sulfuric acid | 50 | 15 | 0 | <u>1</u> | 0 | <u>43.6</u> | X | Comparative Example1 |
| Inventive Steel2 | 15% Sulfuric acid | 50 | 10 | 0 | 4 | 0 | 18.2 | X | Inventive Example1 |
| Inventive Steel3 | 15% Sulfuric acid | 50 | 12 | 0 | 8 | 0 | 13.8 | X | Inventive Example 2 |
| Inventive Steel4 | 15% Sulfuric acid | 50 | 15 | 0 | 15 | 0 | 9.1 | X | Inventive Example 3 |
| Inventive Steel5 | 15% Sulfuric acid | 50 | 13 | 10 | 25 | 0 | 8.7 | X | Inventive Example 4 |
| Inventive Steel6 | 15% Sulfuric acid | 50 | 9 | 0 | 40 | 0 | 6.8 | X | Inventive Example 5 |
| Comparative Steel1 | 15% Sulfuric acid | 50 | 8 | 4 | <u>1</u> | 0.5 | <u>26.2</u> | <u>O</u> | Comparative Example2 |
| Comparative Steel2 | 15% nitric acid | 50 | 11 | 5.5 | 4 | 0.5 | 14.8 | <u>O</u> | Comparative Example3 |
| Inventive Steel4 | 15% nitric acid | 50 | 16 | 8 | 8 | 0.5 | 10.2 | X | Inventive Example 6 |
| Inventive Steel5 | 15% nitric acid | 50 | 8 | 4 | 15 | 0.5 | 7.6 | X | Inventive Example 7 |
| Inventive Steel1 | 15% nitric acid | 50 | 14 | 7 | 25 | 0.5 | 6.8 | X | Inventive Example 8 |
| Inventive Steel2 | 15% nitric acid | 50 | 7 | 3.5 | 40 | 0.5 | 6.3 | X | Inventive Example 9 |
| Inventive Steel4 | 15% nitric acid | 50 | 10 | 10 | <u>1</u> | 1 | <u>21.8</u> | O | Comparative Example4 |
| Inventive Steel2 | 15% nitric acid | 50 | 15 | 15 | 4 | 1 | 10.1 | <u>O</u> | Comparative Example5 |
| Inventive Steel1 | 15% nitric acid | 50 | 13 | 13 | 8 | 1 | 8.2 | <u>O</u> | Comparative Example6 |
| Inventive Steel1 | 15% nitric acid | 50 | 10 | 10 | 15 | 1 | 7 | <u>O</u> | Comparative Example7 |
| Comparative Steel1 | 15% nitric acid | 50 | 9 | 9 | 25 | 1 | 6.5 | <u>O</u> | Comparative Example8 |
| Inventive Steel4 | 15% nitric acid | 50 | 8 | 8 | 40 | 1 | 6.1 | <u>O</u> | Comparative Example9 |

TABLE 2-continued

| | Electrolysis process | | nitric acid and hydrofluoric acid iImmersion nitric | | | | | | |
|---|---|---|---|---|---|---|---|---|---|
| | solution | temperature (° C.) | acid (wt %) | hydrofluoric acid (wt %) | Ic (A/dm²) | [hydrofluoric acid]/[nitric acid] | contact resistance (mΩcm²) | surface rust after endurance test | remark |
| Inventive Steel5 | 15% nitric acid | 50 | 14 | 21 | 1 | 1.5 | 18.2 | O | Comparative Example10 |
| Inventive Steel3 | 15% nitric acid | 50 | 11 | 16.5 | 4 | 1.5 | 9.8 | O | Comparative Example11 |
| Inventive Steel3 | 15% nitric acid | 50 | 10 | 15 | 8 | 1.5 | 7.8 | O | Comparative Example12 |
| Inventive Steel5 | 15% Sulfuric acid | 50 | 13 | 19.5 | 15 | 1.5 | 7 | O | Comparative Example13 |
| Comparative Steel2 | 15% Sulfuric acid | 50 | 10 | 15 | 25 | 1.5 | 16.3 | O | Comparative Example14 |
| Inventive Steel6 | 15% Sulfuric acid | 50 | 8 | 12 | 40 | 1.5 | 5.9 | O | Comparative Example15 |
| Comparative Steel1 | 15% Sulfuric acid | 50 | 12 | 24 | 1 | 2 | 18 | O | Comparative Example16 |
| Inventive Steel2 | 15% Sulfuric acid | 50 | 14 | 28 | 4 | 2 | 9.7 | O | Comparative Example17 |
| Inventive Steel5 | 15% Sulfuric acid | 50 | 13 | 26 | 8 | 2 | 7.8 | O | Comparative Example18 |
| Inventive Steel4 | 15% Sulfuric acid | 50 | 12 | 24 | 15 | 2 | 7.1 | O | Comparative Example19 |
| Comparative Steel2 | 15% Sulfuric acid | 50 | 14 | 28 | 25 | 2 | 6.2 | O | Comparative Example20 |
| Inventive Steel6 | 15% Sulfuric acid | 50 | 9 | 18 | 40 | 2 | 5.9 | O | Comparative Example21 |

Referring to Tables 1 and 2, in Comparative Steels 1 and 2, which are steels containing less than 22% Cr content, referring to Comparative Examples 2, 3, 8, 14, 16, 20, regardless of the applied current density and the weight ratio of [hydrofluoric acid]/[nitric acid], it was found that surface rust occurred after the endurance test of the fuel cell.

Such surface rusting is caused by the formation of Fe-oxide eluted while the passivation film on the surface cannot withstand the fuel cell strong acid operating environment (about pH=3) under the fuel cell operating conditions and repeats the destruction and repassivation process of film. Therefore, the present inventor found that the minimum Cr content should contain 22% or more to have passivation film stability in the fuel cell operating environment.

In addition, referring to FIG. 1 and Table 2, it can be seen that in the steels with a Cr content of 22% or more (Inventive Steel 1 to Inventive Steel 6), the following equation (1) must be satisfied in order to secure contact resistance of 20 mΩcm² or less.

$$Ic > -2.23([\text{hydrofluoric acid}]/[\text{nitric acid}]) + 3.79 \quad (1)$$

Here, Ic is a cathode applied current density (A/dm²), and [hydrofluoric acid]/[nitric acid] means a weight ratio of hydrofluoric acid and nitric acid.

In an embodiment of the present disclosure, it was found that Ic must satisfy equation (1) in the electrochemical electrolysis process of removing the first passivation film. If Ic does not satisfy equation (1), the first passivation film cannot be completely removed, and the remainder of the first passivation film interferes with the electrochemical reaction essential in the nitric acid and hydrofluoric acid immersion process. Therefore, it is possible to hinder the formation of the second passivation film, which is essential to secure stainless steel having excellent contact resistance and fuel cell durability in a fuel cell environment. In addition, in the nitric acid and hydrofluoric acid immersion process to form the second passivation film, the first passivation film locally remaining on the surface acts as a cathode to generate a potential difference with the base material from which the first passivation film has been removed, so that excessive erosion locally may occur on the base material. Therefore, it was found that it is preferable that Ic satisfies the above equation (1) in the electrochemical electrolysis process.

In addition, in one embodiment of the present disclosure, in the nitric acid and hydrofluoric acid immersion process forming the second passivation film, the weight ratio of [hydrofluoric acid]/[nitric acid] should be limited to 0.6 or less. When the weight ratio of [hydrofluoric acid]/[nitric acid] exceeds 0.6, hydrofluoric acid excessively erodes the passivation film of the base material, impairing the stability of the passivation film, causing the destruction of the passivation film in the operating environment of the fuel cell, accelerating the elution of the Fe element in the base material, causing rust, and fuel cell membrane electrode assembly (MEA) is deteriorated. Therefore, it was found that the weight ratio of [hydrofluoric acid]/[nitric acid] during immersion is preferably maintained at 0.6 or less.

That is, according to the stainless steel according to an embodiment of the present disclosure, the surface contact resistance can be secured even if a separate surface treatment such as coating is not performed on the surface of stainless steel for polymer fuel cell separators. In addition, it is an environmentally friendly process by minimizing hydrofluoric acid during the manufacturing process. By minimizing hydrofluoric acid, the durability of the fuel cell could be improved by preventing the passivation film of stainless steel and the stability of the passivation film in the overpassive region from being impaired.

As described above, although exemplary embodiments of the present disclosure have been described, the present disclosure is not limited thereto, and a person with ordinary knowledge in the relevant technical field does not depart from the concept and scope of the following claims. It will be appreciated that various changes and modifications are possible in.

The invention claimed is:

1. A method of manufacturing a stainless steel for a polymer fuel cell separator, the method comprising:
   electrolyzing to remove a first passivation film formed on a cold-rolled sheet of a stainless steel comprising, in percent (%) by weight of the entire composition, C: greater than 0 to 0.1%, N: greater than 0 to 0.02%, Si: greater than 0 to 0.25%, Mn: greater than 0 to 0.2%, P: greater than 0 to 0.04%, S: greater than 0 to 0.02%, Cr: 29.7 to 30.1%, Ti: greater than 0 to 0.5%, Nb: greater than 0 to 0.5%, the remainder of iron (Fe) and inevitable impurities; and
   immersing in an acid solution to form a second passivation film on the stainless cold-rolled sheet,
   wherein the electrolyzing is performed in 5 to 30% by weight of sulfuric acid solution at 40 to 80° C. and a cathode applied current density (Ic) is 4 to 15 A/dm$^2$,
   the immersing in the acid solution is performed in 10 to 15% by weight of nitric acid at 40 to 60° C.,
   the acid solution does not comprise hydrofluoric acid,
   a contact resistance of the second passivation film is 18.2 mΩcm$^2$ or less, and
   no surface rust is found on a surface of the polymer fuel cell separator after performing a static potential endurance test at 0.6V for 300 hours.

2. The method of claim 1, wherein the cold-rolled sheet of the stainless steel further comprises any one or more selected from the group consisting of Cu: greater than 0 to 0.6%, V: greater than 0 to 0.6%, and Mo: 0.05 to 2.5%.

* * * * *